US008985299B2

(12) United States Patent
Liao

(10) Patent No.: US 8,985,299 B2
(45) Date of Patent: Mar. 24, 2015

(54) PAPER-TYPE DETECTION DEVICE AND DETECTION METHOD

(71) Applicant: GRG Banking Equipment Co., Ltd., Guangzhou, Guangdong (CN)

(72) Inventor: Junqing Liao, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/348,467

(22) PCT Filed: Oct. 26, 2012

(86) PCT No.: PCT/CN2012/083604

§ 371 (c)(1),
(2) Date: Mar. 28, 2014

(87) PCT Pub. No.: WO2013/082979

PCT Pub. Date: Jun. 13, 2013

(65) Prior Publication Data

US 2014/0224615 A1 Aug. 14, 2014

(30) Foreign Application Priority Data

Dec. 8, 2011 (CN) .......................... 2011 1 0406846

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2011.01) |

(Continued)

(52) U.S. Cl.
CPC .................. *G07D 7/12* (2013.01); *B65H 43/04* (2013.01); *B65H 7/06* (2013.01); *B65H 2511/51* (2013.01);
(Continued)

(58) Field of Classification Search
USPC .......... 194/206, 207, 215–218, 302; 377/7, 8; 902/7; 235/2, 4, 377, 379, 383; 209/534; 382/135, 136
See application file for complete search history.

(56) References Cited

U.S. PATENT DOCUMENTS 4,034,839 A * 7/1977 Lee .............................. 194/218
4,381,447 A 4/1983 Horvath et al.

(Continued)

FOREIGN PATENT DOCUMENTS

CN 1991921 A 7/2007
CN 101030302 A 9/2007

(Continued)

OTHER PUBLICATIONS

NAMA Multi-Drop Bus/Internal Communications Protocol MDB/ICP, Version 4.2, Feb. 2011, National Automatic Merchandising Association, pp. 1-313.*

(Continued)

*Primary Examiner* — Jeffrey Shapiro
(74) *Attorney, Agent, or Firm* — Wolf, Greenfield & Sacks, P.C.

(57) ABSTRACT

A paper-type detection device comprises a sensor unit, a storage unit and a control unit. The sensor unit is used for detecting a transmission state of a paper according to a fixed clock period, and carrying out binaryzation on detected signals to indicate the presence-absence state of the paper. The storage unit is used for acquiring the signals detected by the sensor unit, acquiring paper information in the signals, and storing the paper information in sequence. The control unit comprises a first state counter and a second state counter. The control unit controls the two state counters for carrying out zero clearing and starting operations for counting in conjunction with the sensor unit.

10 Claims, 8 Drawing Sheets

(51) Int. Cl.

| | |
|---|---|
| ***G07D 7/12*** | (2006.01) |
| ***B65H 43/04*** | (2006.01) |
| ***B65H 7/06*** | (2006.01) |
| ***G07D 7/00*** | (2006.01) |
| ***B65H 29/00*** | (2006.01) |
| ***G07D 11/00*** | (2006.01) |
| ***G07D 7/16*** | (2006.01) |
| ***B65H 5/00*** | (2006.01) |

(52) U.S. Cl.

CPC ....... *B65H 2511/515* (2013.01); *B65H 2557/23* (2013.01); *B65H 2557/33* (2013.01); *B65H 2557/352* (2013.01); *G07D 7/00* (2013.01); *B65H 2511/415* (2013.01); *B65H 29/001* (2013.01); *B65H 2511/164* (2013.01); *B65H 2511/30* (2013.01); *G07D 11/0084* (2013.01); *B65H 2553/412* (2013.01); *G07D 7/16* (2013.01); *B65H 2701/1912* (2013.01); *B65H 5/002* (2013.01)

USPC ................ 194/218; 194/216; 194/217; 377/7

(56) References Cited

U.S. PATENT DOCUMENTS

| | | | | | |
|---|---|---|---|---|---|
| 5,579,886 | A * | 12/1996 | Ishida et al. | .................. | 194/202 |
| 5,781,444 | A * | 7/1998 | Ishida et al. | .................. | 700/232 |
| 5,793,629 | A * | 8/1998 | Ishida et al. | ....................... | 700/2 |
| 2005/0056519 | A1* | 3/2005 | Yokoi et al. | ................... | 194/206 |
| 2007/0227856 | A1* | 10/2007 | Gopel | ........................... | 194/206 |

FOREIGN PATENT DOCUMENTS

| | | | |
|---|---|---|---|
| CN | 101540075 | A | 9/2009 |
| CN | 101887606 | A1 | 11/2010 |
| CN | 101916470 | A | 12/2010 |
| CN | 102411805 | A | 4/2012 |
| GB | 1385116 | A | 2/1975 |
| GB | 2457107 | B | 7/2010 |
| JP | 60242166 | A | 12/1985 |
| JP | 1991921 | A | 12/2010 |
| JP | 2010282535 | A | 12/2010 |
| WO | WO 2011009856 | A1 | 1/2011 |

OTHER PUBLICATIONS

International Search Report dated Feb. 7, 2012 from corresponding International Application PCT/CN2012/083604.

European Search Report dated Aug. 27, 2014 from corresponding European Application No. 12855708.9.

* cited by examiner

PAPER-TYPE DETECTION DEVICE AND DETECTION METHOD

This application is the National Stage application of PCT international application No. PCT/CN2012/083604, filed on Oct. 26, 2012, which claims the priority of Chinese Patent Application No. 201110406846.1, entitled "PAPER-TYPE DETECTION DEVICE AND DETECTION METHOD", filed with State Intellectual Property Office of PRC on Dec. 8, 2011, which applications are incorporated herein by reference to the maximum extent allowable by law.

FIELD OF THE INVENTION

The present invention relates to the field of financial technology, and in particular to a paper currency detection apparatus and a paper currency detection method for an anti-interference detection of a damaged paper currency or a paper material foreign matter in an Automatic Teller Machine (abbreviated as ATM).

BACKGROUND OF THE INVENTION

Detecting transmission states of a paper currency in a channel by using an optical sensor is a method generally used in an ATM. A detection apparatus for a paper currency and the like in the prior art usually includes an optical sensor, a control unit and a storage unit. A group of sensor state sequences representing information of paper currencies may be generated under triggering of a given clock when a group of paper currencies pass through the optical sensor in sequence, and the group of the sensor state sequences, after being binarized by the sensor unit, may be described as time sequence logical states shown in Table 1:

TABLE 1

| logical state Z of paper currency | time sequences of output states of sensor unit | |
|---|---|---|
| | current state (Q0) | next state (Q1) |
| paper currency arrival (S4) | lighted (L) | shielded (D) |
| paper currency existence (S3) | shielded (D) | shielded (D) |
| paper currency leave (S2) | shielded (D) | lighted (L) |
| paper currency nonexistence (S1) | lighted (L) | lighted (L) |

The transformation among the logical states of the paper currency is implemented by the control unit, the employed method is shown in FIG. 1, where X represents the state value outputted from the sensor unit; the control unit and the storage unit perform different operations according to the logical states of the paper currency and finally record the paper currency information, the commonly-used method is shown in Table 2:

TABLE 2

| logical state Z of paper currency | corresponding process of control unit | corresponding process of storage unit |
|---|---|---|
| paper currency arrival (S4) | adjusting the value of the record pointer to make it point to the next storage location | starting collection of the sensor state |
| paper currency existence (S3) | | collecting the sensor state |
| paper currency leave (S2) | | calculating paper currency information and storing it to the location pointed by the record pointer |
| paper currency nonexistence (S1) | | |

According to the record method of Table 2, normally only one "paper currency arrival" state and only one "paper currency leave" state can occur to the control unit during the whole collection period when a complete paper currency passes through the optical sensor, and therefore an piece of unique paper currency record information corresponds to the paper currency.

However, paper currencies of various counties in the world are different in design, and paper currencies of some counties themselves have features such as holes and gaps; moreover, the paper currency is easy to be damaged during circulation and is worsened gradually. So several "paper currency arrival" states and several "paper currency leave" states might occur when the worsened paper currency passes through the optical sensor (for example, the damaged paper currency has gaps), and thus several pieces of record information are generated for one paper currency. As a result, the state machine shown in FIG. 1 cannot meet the requirement of the paper currency detection for such a case.

SUMMARY OF THE INVENTION

Embodiments of the present invention provide a paper currency detection apparatus and a paper currency detection method, which can effectively eliminate interferences due to the worsened paper currencies and ensure that the record sequence of the paper currency information is the same as the transmission sequence of the paper currency.

An embodiment of the present invention provides a paper currency detection apparatus, which includes:

a sensor unit for detecting a transmission state of a paper currency according to a fixed clock period, and binarizing the detected signal to represent whether the paper currency appears;

a storage unit for collecting the signal detected by the sensor unit, acquiring paper currency information in the signal and storing the paper currency information in sequence;

a control unit including a first state counter and a second state counter, where the control unit resets the first state counter and starts the first state counter to count according to the fixed clock period when a time sequence state of the signal detected by the sensor unit represents that the paper currency appears and when a count value of the second state counter is 0 or reaches or exceeds a preset threshold; the control unit adjusts a pointer for recording the paper currency information in the storage unit to point to a next storage location of the paper currency information when a count value of the first state counter reaches or exceeds the preset threshold; the control unit resets and starts the second state counter to count according to the fixed clock period when the time sequence state of the signal detected by the sensor unit represents that the paper currency disappears and when the count value of the first state counter is 0 or reaches or exceeds the preset threshold; the control unit controls the storage unit to store the acquired paper currency information into the storage location pointed by the pointer when the count value of the second state counter reaches or exceeds the preset threshold.

In addition, an embodiment of the present invention further provides a paper currency detection method, which includes the following steps:

A1, detecting a transmission state of a paper currency according to a fixed clock period and binarizing the detected signal to represent whether the paper currency appears, by a sensor unit;

A2, resetting a first state counter and starting the first state counter to count according to the fixed clock period by a control unit when a time sequence state of the signal detected by the sensor unit represents that the paper currency appears and when a count value of a second state counter is 0 or reaches or exceeds a preset threshold;

A3, adjusting a pointer for recording the paper currency information in a storage unit to point to a next storage location of the paper currency information when a count value of the first state counter reaches or exceeds the preset threshold;

A4, resetting the second state counter and starting the second state counter to count according to the fixed clock period by the control unit when the time sequence state of the signal detected by the sensor unit represents that the paper currency disappears and when the count value of the first state counter is 0 or reaches or exceeds the preset threshold; and A5, controlling the storage unit to store the paper currency information acquired from the signal detected by the sensor unit into the storage location pointed by the pointer by the control unit when the count value of the second state counter reaches or exceeds the preset threshold.

The embodiments of the present invention have the following beneficial effects:

the paper currency detection apparatus and paper currency detection method provided by the embodiments of the present invention are particularly applicable for an anti-interference detection of a partially damaged paper currency or a paper material foreign matter in an Automatic Teller Machine (abbreviated as ATM), where the paper currency detection apparatus includes a sensor unit, a storage unit and a control unit, the control unit includes and controls two state counters to count by resetting and starting in cooperation with the sensor unit, eliminates interferences (for example, holes on the damaged paper currency) within a preset threshold by means of a finite state machine (FSM), and therefore effectively eliminates the interferences due to the worsened paper currency and ensures that the record sequence of the paper currency information is the same as the transmission sequence of the paper currency.

DETAILED DESCRIPTION OF THE INVENTION

The technical solutions of the embodiments of the present disclosure will be described clearly and completely in conjunction with the drawings. Apparently, the described embodiments are only some rather than all embodiments of the present disclosure. Any other embodiments obtained from the embodiments of the present disclosure by those skilled in the art without any inventive labor fall within the scope of the invention.

Figure 2A:
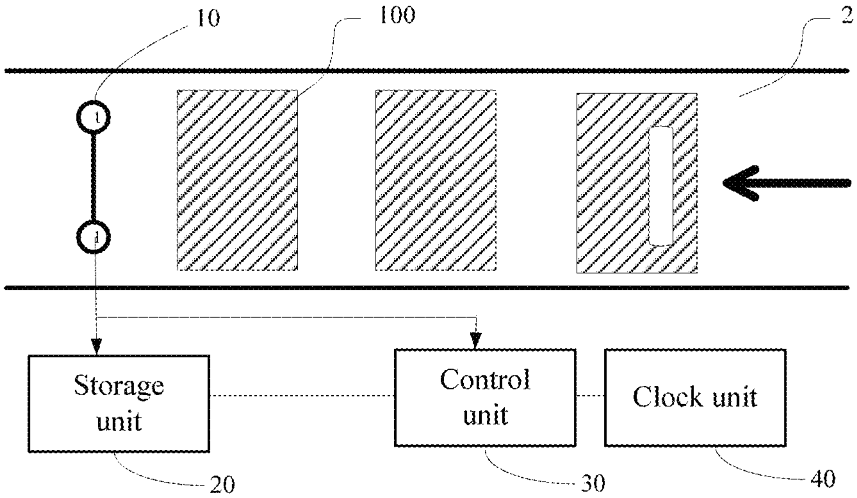
FIGS. 2*a*-2*b* are structural diagram of a paper currency detection apparatus provided by the present invention.
Figure 2B:
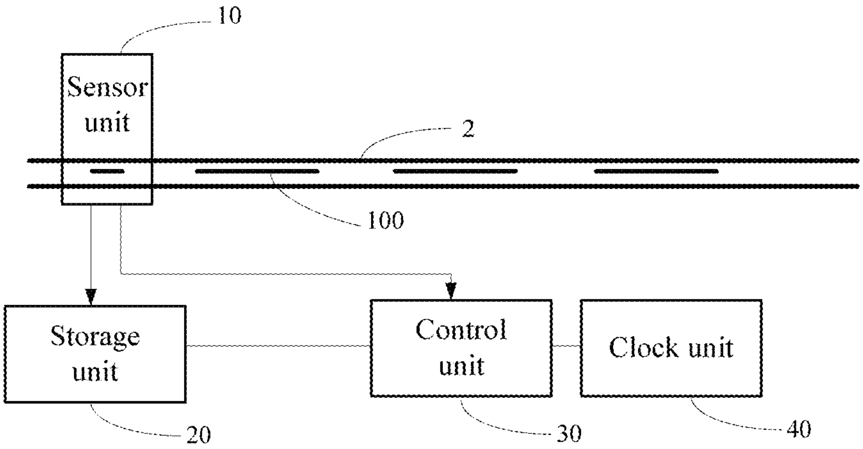

Referring to FIGS. 2*a*-2*b*, a paper currency detection apparatus 1 of the present invention includes a sensor unit 10, a storage unit 20, a control unit 30 and a clock unit 40.

The sensor unit 10 is used for detecting a transmission state of a paper currency 100 on a transmission channel 2 according to a fixed clock period, and binarizing the detected signal to represent whether the paper currency 100 appears.

The storage unit 20 is used for collecting the signal detected by the sensor unit 10, acquiring paper currency information in the signal and storing the paper currency information in sequence.

The control unit 30 includes a first state counter and a second state counter. When the time sequence state of the signal detected by the sensor unit 10 represents that the paper currency appears and the count value of the second state counter is 0 or reaches or exceeds a preset threshold, the control unit 30 suspends the counting of the second state counter, and meanwhile resets and starts counting of the first state counter according to the fixed clock period; when the count value of the first state counter reaches or exceeds the preset threshold, the control unit 10 suspends the counting of the first state counter, and adjusts a pointer in the storage unit for recording paper currency information to make it point to a next storage location of paper currency information; when the time sequence state of the signal detected by the sensor unit 10 represents that the paper currency disappears and the count value of the first state counter is 0 or reaches or exceeds the preset threshold, the control unit 30 suspends the counting of the first state counter, and meanwhile resets and starts the counting of the second state counter according to the fixed clock period; when the count value of the second state counter reaches or exceeds the preset threshold, the control unit 30 suspends the counting of the second state counter, and controls the storage unit 20 to store the acquired paper currency information into the storage location pointed by the pointer.

The clock unit 40 is used for providing the fixed clock period.

The preset threshold is determined by the following equation:

$$P=[K\cdot W/(V\cdot T)];$$

where P is the preset threshold, W represents the width between both sides of the paper currency paralleled with the transmission channel when the paper currency is being transmitted (in unit of mm); V represents the rate of the transmission channel (in unit of mm/s); T represents the clock period outputted from the clock unit (in unit of ms); [K·W/(V·T)] represents a rounding operation performed on K·W/(V·T); and K represents a threshold coefficient. The width W is 70-78 mm, the rate of the transmission channel V is 1000-1500 mm/s, the clock period T is 1-2 ms and K is 80-120, therefore the preset threshold P is 4-8.

Figure 3:
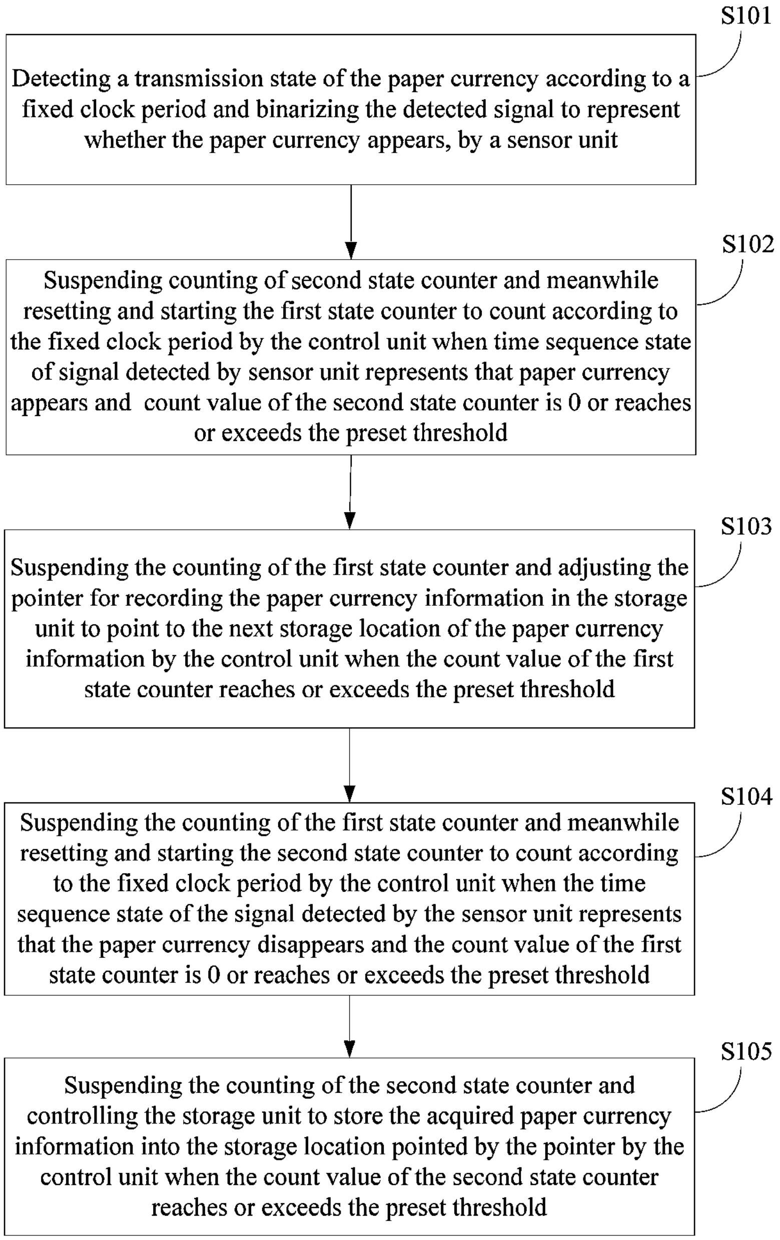
FIG. 3 is a flow chart of a paper currency detection method provided by the present invention.

Referring to FIG. 3, which is a flow chart of a paper currency detection method provided by the present invention. The method specifically includes the following steps:

S101, detecting a transmission state of the paper currency according to a fixed clock period and binarizing the detected signal to represent whether the paper currency appears, by a sensor unit;

S102, suspending the counting of the second state counter and meanwhile resetting and starting the first state counter to count according to the fixed clock period by the control unit when the time sequence state of the signal detected by the sensor unit represents that the paper currency appears and the count value of the second state counter is 0 or reaches or exceeds the preset threshold;

S103, suspending the counting of the first state counter and adjusting the pointer for recording the paper currency information in the storage unit to point to the next storage location of the paper currency information by the control unit when the count value of the first state counter reaches or exceeds the preset threshold;

S104, suspending the counting of the first state counter and meanwhile resetting and starting the second state counter to count according to the fixed clock period by the control unit when the time sequence state of the signal detected by the sensor unit represents that the paper currency disappears and the count value of the first state counter is 0 or reaches or exceeds the preset threshold; and

S105, suspending the counting of the second state counter and controlling the storage unit to store the acquired paper currency information into the storage location pointed by the pointer by the control unit when the count value of the second state counter reaches or exceeds the preset threshold.

A specific process flow of the paper currency detection method of the present invention is further described below in connection with FIGS. 4-6.

Figure 1:
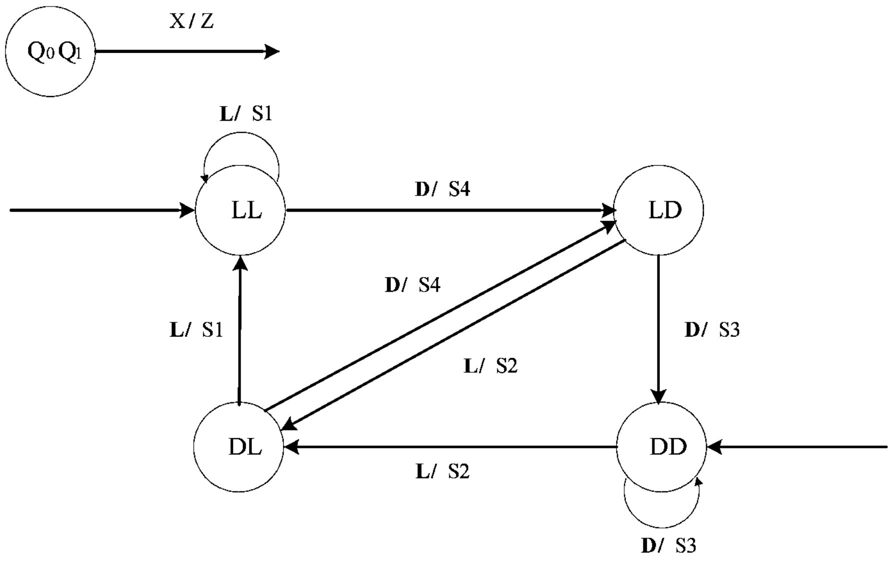
FIG. 1 is a schematic diagram of logical states of a paper currency in a paper currency detection method in the prior art.

It can be known from an analysis that in the existing paper currency detection method, the transformation of logical states of the paper currency would be interfered when a worsened paper currency passes through the optical sensor, and the essence of such interference is that there are several time sequences of "shielded (D)->lighted (L)" and "lighted (L)->shielded" (i.e., Q0 Q1==LD or Q0 Q1==DL). In order to eliminate such interference in the time sequences, in the control unit 30 according to the present invention, the following improvements are made based on the state machine of the prior art shown in FIG. 1:

(1) two new logical states of the paper currency are introduced, which are "paper currency temporal arrival state (S5)" and "paper currency temporal leave state (S6)", the corresponding time sequences of the sensor states are LD, DD and DL, LL respectively.

(2) the corresponding time sequences of the sensor states for the original two logical states "paper currency arrival state (S4)" and "paper currency leave state (S2)" of the paper currency are changed to DD and LL respectively.

(3) since some of the time sequences of the sensor states corresponding to various logical states are coincident with each other after the changes, two state counters (a second state counter CNT0 and a first state counter CNT1) and an interference judgment threshold (P) related to the counters are added to differentiate these logical states.

After the improvement, the new logical states of the paper currency of the present invention are shown in Table 3:

TABLE 3

| logical state Z | time sequences of output states of sensor unit | | state counter | |
|---|---|---|---|---|
| of paper currency | current state (Q0) | next state (Q1) | CNT1 | CNT0 |
| paper currency temporal arrival (S5) | lighted (L)<br>shielded (D) | shielded (D)<br>shielded (D) | CNT1 == 0<br>CNT1 < P and CNT1 > 0 | |
| paper currency arrival (S4) | shielded (D) | shielded (D) | CNT1 == P | |
| paper currency existence (S3) | shielded (D) | shielded (D) | CNT1 > P or CNT1 == 0 | |
| paper currency temporal leave (S6) | shielded (D)<br>lighted (L) | lighted (L)<br>lighted (L) | | CNT0 == 0<br>CNT0 < P and CNT0 > 0 |
| paper currency leave (S2) | lighted (L) | lighted (L) | | CNT0 == P |
| paper currency non-existence (S1) | lighted (L) | lighted (L) | | CNT0 > P or CNT0 == 0 |

Figure 4:
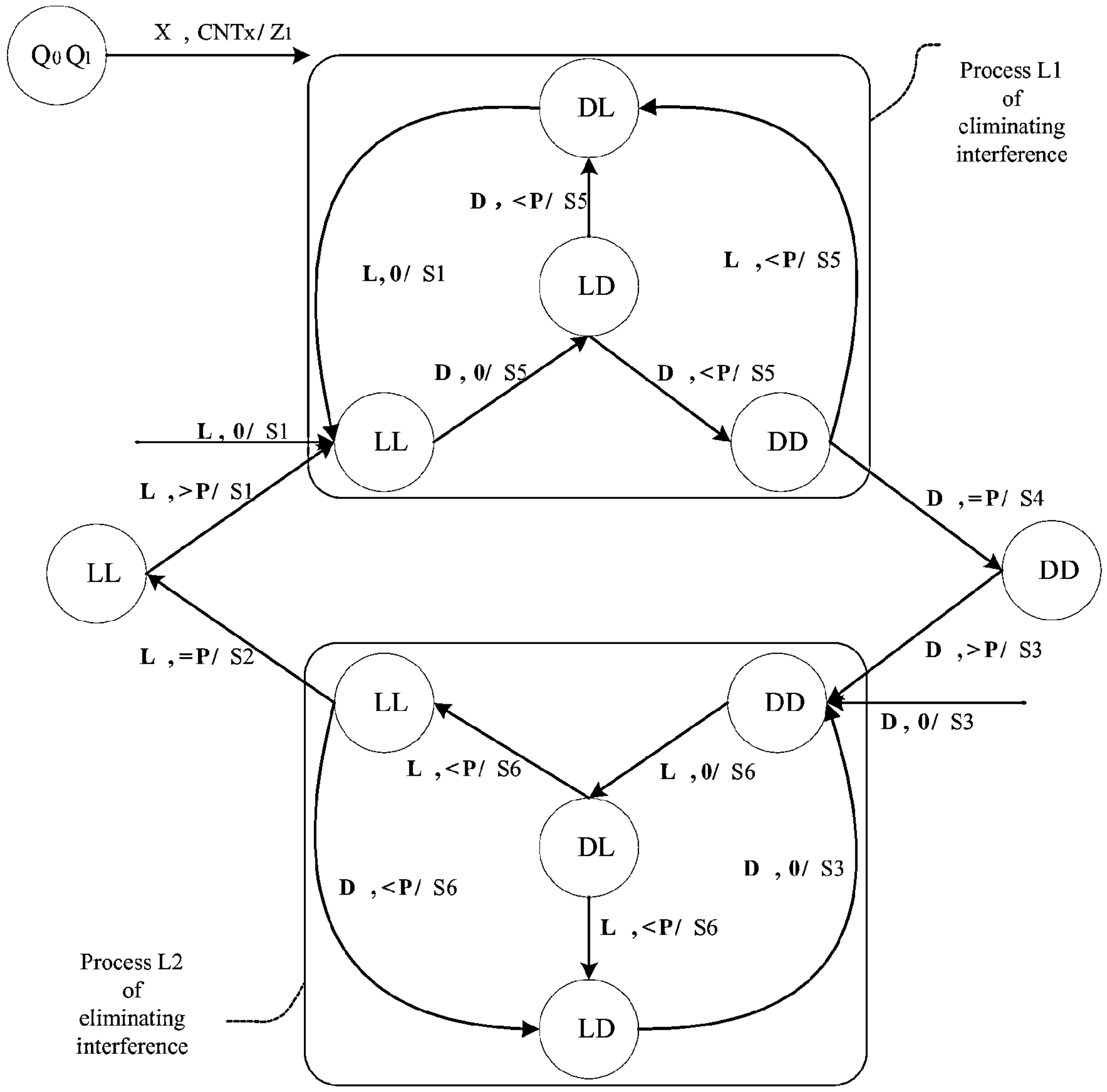
FIG. 4 is a schematic diagram of logical states of a paper currency in a paper currency detection method provided by the present invention.

From the logical states of the paper currency shown in FIG. 3, the transformation of the logical states of the paper currency can be obtained, as shown in FIG. 4. It can be seen from FIG. 4 that since two logical states of "paper currency temporal arrival (S5)" and "paper currency temporal leave (S6)" are added, the occurred interference in the case of worsened paper currency is merely increased number of "paper currency temporal arrival (S5)" and "paper currency temporal leave (S6)" states, and the redundant "paper currency arrival (S4)" and "paper currency leave (S2)" states will not occur as long as the preset judgment threshold P is properly set (as shown by L1 and L2 in FIG. 4). The implementation of the paper currency information record by the control unit 30 and the storage unit 20 is changed accordingly, as shown in Table 4:

TABLE 4

| logical state Z of paper currency | corresponding process of control unit | corresponding process of storage unit |
|---|---|---|
| paper currency temporal arrival (S5) | resetting and starting the state counter CNT1, the CNT1 accumulates | starting the collection of the sensor state |
| paper currency arrival (S4) | adjusting the value of the record pointer to point to the next storage location; performing an accumulation operation of CNT1 if the state counter CNT1 is started | collecting the sensor state |
| paper currency existence (S3) | performing an accumulation operation of CNT1 if the state counter CNT1 is started | collecting the sensor state |
| paper currency temporal leave (S6) | resetting and starting the state counter CNT0, the CNT0 accumulates | collecting the sensor state |

TABLE 4-continued

| logical state Z of paper currency | corresponding process of control unit | corresponding process of storage unit |
|---|---|---|
| paper currency leave (S2) | performing an accumulation operation of CNT0 if the state counter CNT0 is started | calculating the paper currency information and storing the information into the location pointed by the record pointer |
| paper currency nonexistence (S1) | performing an accumulation operation of CNT0 if the state counter CNT0 is started | |

Figure 5:
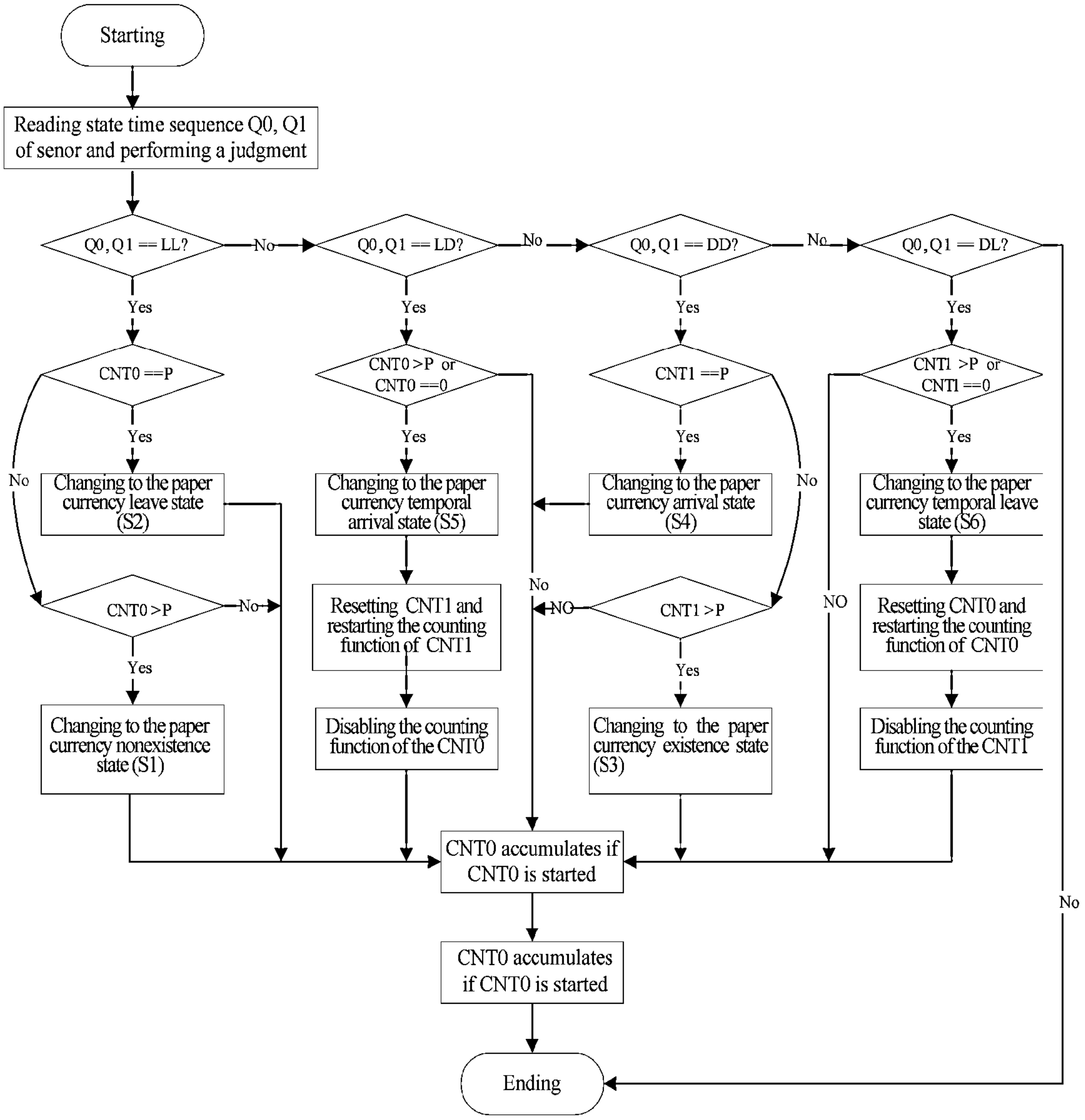
FIG. 5 is a flow chart for an updated logical states of the paper currency in the paper currency detection method shown in FIG. 4.
Figure 6:
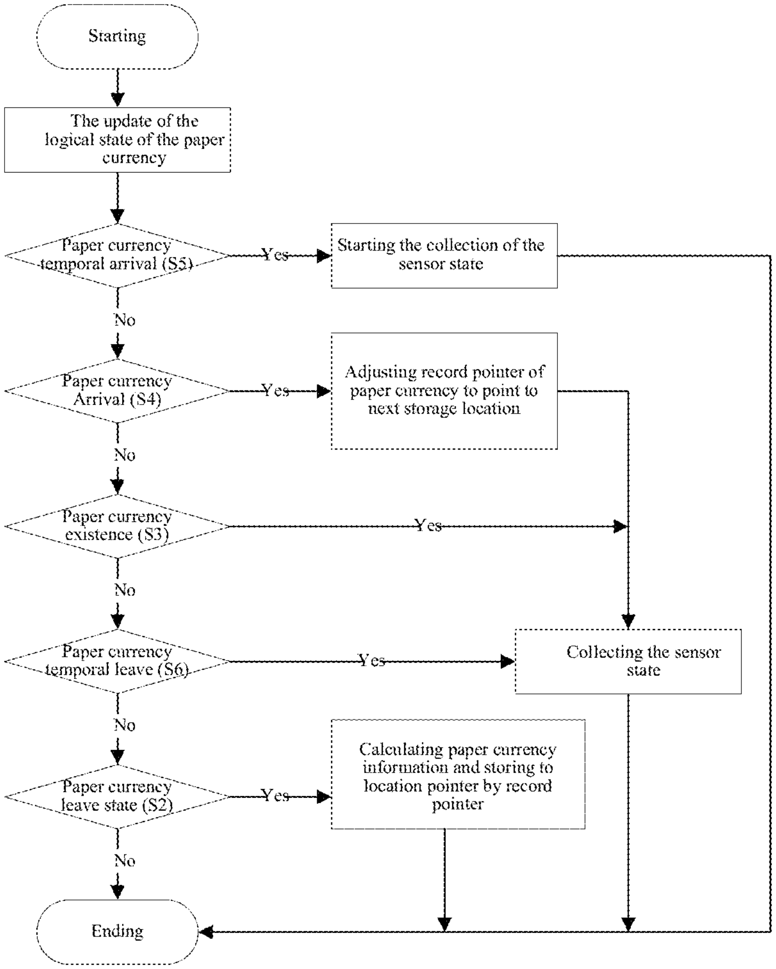
FIG. 6 is a flow chart for processing information stored in the storage unit corresponding to the updated logical states of the paper currency shown in FIG. 5.

Referring to FIGS. 5 and 6, the operations of the control unit 30 and the storage unit 20 in the paper currency detection method are further described in detail in connection with Table 4 and FIG. 4. FIG. 5 illustrates an updated operation process for the logical states of the paper currency by the control unit 30, which includes:

step S10: starting;

step S11: reading the time sequence of the current state (Q0) and the next state (Q1) of the sensor unit 10 and performing a judgment;

step S12: proceeding to step S13 if the state time sequence of the current state (Q0) and the next state (Q1) is lighted (L)->lighted (L), i.e., Q0 Q1==LL, otherwise proceeding to step S22;

step S13: determining whether the value of the second state counter CNT0 is equal to the judgment threshold P, proceeding to step S14 if the value of the second state counter CNT0 is equal to the judgment threshold P, otherwise proceeding to step S15;

step S14: changing the logical state of the paper currency to the paper currency leave state (S2) and proceeding to step S17, meanwhile, calculating the paper currency information and storing into the location pointed by the record pointer during the collection of the state of the sensor unit 10, by the storage unit 20, as shown in FIG. 6;

step S15: determining whether the value of the second state counter CNT0 is larger than the judgment threshold P, proceeding to step S16 if the value of the second state counter CNT0 is larger than the judgment threshold P, otherwise proceeding to step S17;

step S16: changing the logical state of the paper currency to the paper currency nonexistence state (S1) and proceeding to step S17;

step S22: proceeding to step S23 if the state time sequence of the current state (Q0) and the next state (Q1) is lighted (L)->shielded (D), i.e., Q0 Q1==LD, otherwise proceeding to step S32;

step S23: determining whether the value of the second state counter CNT0 is larger than the judgment threshold P or is equal to 0, proceeding to step S24 if the value of the second state counter CNT0 is larger than the judgment threshold P or is equal to 0, otherwise proceeding to step S17;

step S24, changing the logical state of the paper currency to the paper currency temporal arrival state (S5) and proceeding to step S25; meanwhile, starting the storage unit 20 to collect the state of the sensor unit 10, as shown in FIG. 6;

step S25: resetting the first state counter CNT1 and restarting the first state counter CNT1 to count;

step S26: disabling the counting function of the second state counter CNT0 and proceeding to step S17;

step S32: proceeding to step S33 if the state time sequence of the current state (Q0) and the next state (Q1) is shielded (D)->shielded (D), i.e., Q0 Q1==DD, otherwise proceeding to step S42;

step S33: determining whether the value of the first state counter CNT1 is equal to the judgment threshold P, proceeding to step S34 if the value of the first state counter CNT1 is equal to the judgment threshold P, otherwise proceeding to step S35;

step S34: changing the logical state of the paper currency to the paper currency arrival state (S4) and proceeding to step S17; meanwhile, adjusting the paper currency record pointer used for the collection of the sensor state unit 10 in the storage unit 20 to point to the next storage location, as shown in FIG. 6;

step S35: determining whether the value of the first state counter CNT1 is larger than the judgment threshold P, proceeding to step S36 if the value of the first state counter CNT1 is larger than the judgment threshold P, otherwise proceeding to step S17;

step S36: changing the logical state of the paper currency to the paper currency existence state (S3) and proceeding to step S17; meanwhile, the storage unit 20 keeps on collecting the state sequence of the sensor unit 10;

step S42: proceeding to step S43 if the state time sequence of the current state (Q0) and the next state (Q1) is shielded (D)->lighted (L), i.e., Q0 Q1==DL, otherwise proceeding to step S19;

step S43: determining whether the value of the first state counter CNT1 is larger than the judgment threshold P or is equal to 0, proceeding to step S44 if the value of the first state counter CNT1 is larger than the judgment threshold P or is equal to 0, otherwise proceeding to step S17;

step S44: changing the logical state of the paper currency to the paper currency temporal leave state (S6) and proceeding to step S45; meanwhile, the storage unit 20 keeps on collecting the state sequence of the sensor unit 10;

step S45: resetting the second state counter CNT0 and restarting the second state counter CNT0 to count;

step S46: disabling the counting function of the first state counter CNT1 and proceeding to step S17;

step S17: accumulating the value of the second state counter CNT0 if the second state counter CNT0 is started;

step S18: accumulating the value of the second state counter CNT0 if the first state counter CNT1 is started;

step S19: ending.

The paper currency detection apparatus and paper currency detection method of the present invention are described by a specific embodiment below in connection with FIGS. 7 and 8.

In the present embodiment, the clock unit 40 outputs clocks of a fixed period; the sensor unit 10 collects the signal of the sensor according to the period and converts the signal to a binarization state; the control unit 30 determines the time sequence state of the sensor unit 10 and the values of the first state counter CNT1 and the second state counter CNT0 according to the clock period, and performs corresponding processes.

When a paper currency C05 with a hole is transmitted on a paper currency transmission channel (provided that the width of the hole H02 is within P clock periods and is larger than 1 clock period), the initial logical state is the paper currency nonexistence state (S1), and the control unit 30 determines the following two conditions when the paper currency arrives at the sensor unit 10 (which is an optical sensor 10 in the present embodiment):

(1) the time sequence state of the optical sensor 10 is Q0, Q1==LD; and (2) the second state counter CNT0>P or CNT0==0, that is, the last logical state of the paper currency must be the paper currency nonexistence state (S1).

Figure 7:
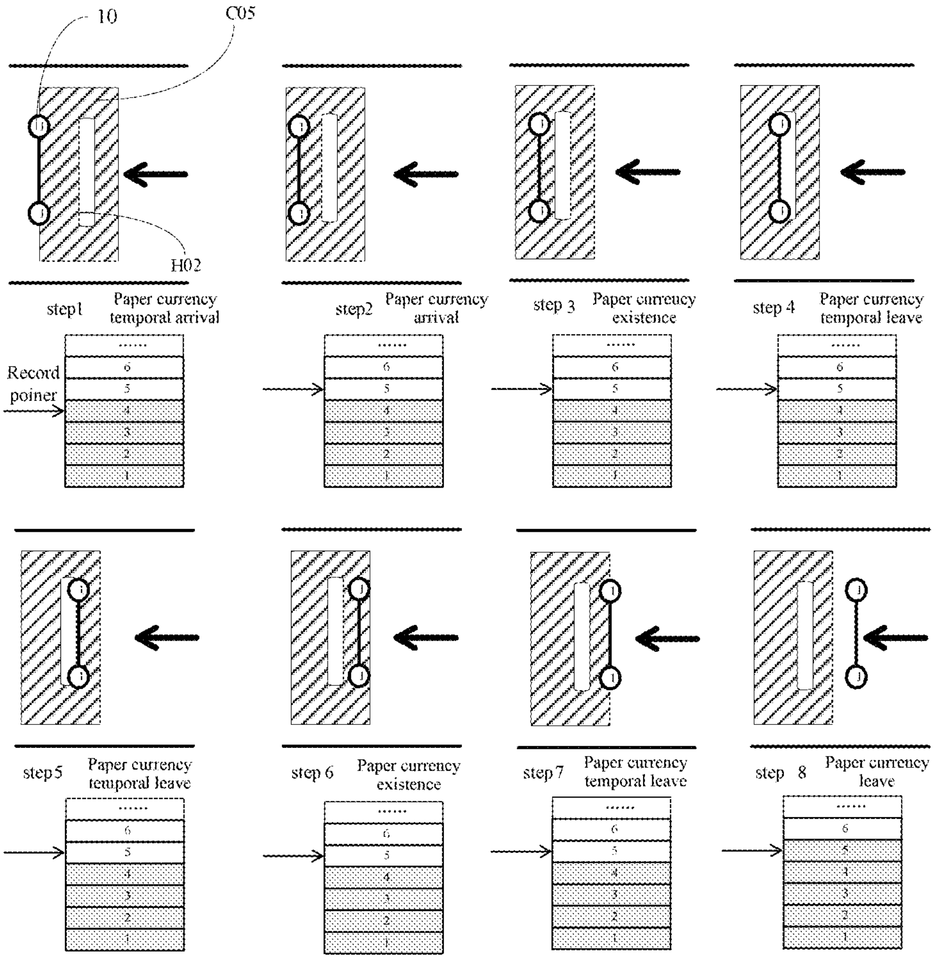
FIG. 7 is a schematic diagram of processing a paper currency with a hole in the detection method for a paper currency provided by an embodiment of the present invention.
Figure 8:
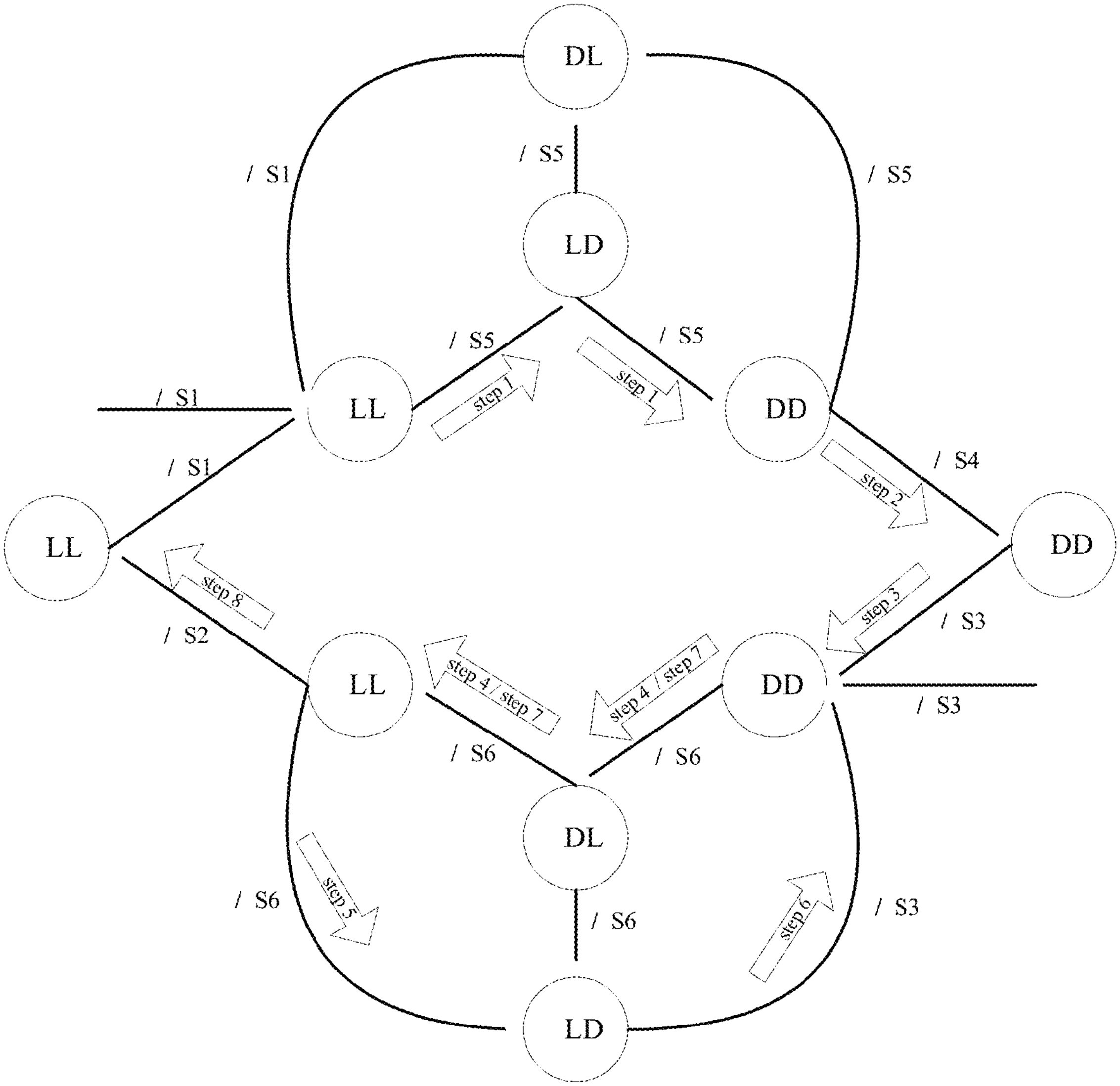
FIG. 8 is a schematic diagram of logical states of the paper currency with the hole in the paper currency detection method shown in FIG. 7.

The two conditions are both satisfied for the paper currency C05, so the logical state of the paper currency is changed to the paper currency temporal arrival state (S5) (step 1 in FIG. 7).

During the paper currency temporal arrival state (S5), the control unit 30 resets the first state counter CNT1 and restarts the CNT1 to count; the CNT1 accumulates according to the clock period, while the value of the second state counter CNT0 is unchanged; the storage unit 20 begins to collect the state sequence of the optical sensor 10.

The logical state of the paper currency is changed to the paper currency arrival state (S4) when the control unit 30 detects that the following two conditions are satisfied (step 2 in FIG. 7):

(3) the time sequence state of the optical sensor is Q0, Q1==DD; and (4) the first state counter CNT1==P.

The paper currency arrival state (S4) is maintained for only one clock period, and the control unit 30 adjusts the paper currency record pointer in the storage unit 20 to point to the next record location (step 2 in FIG. 7). The logical state of the paper currency is changed to the paper currency existence state (S3) when the first state counter satisfies CNT1>P (step 3 in FIG. 7).

During the paper currency existence state (S3), the first state counter CNT1 keeps on accumulating according to the clock period, while the value of the second state counter CNT0 is unchanged; the storage unit keeps on collecting the state sequence of the optical sensor 10.

The control unit 30 performs judgment according to the following two conditions when the hole H02 arrives at the optical sensor 10:

(5) the time sequence state of the sensor is Q0, Q1==DL; and (6) the counter CNT1>P or CNT1==0, that is, the last logical state of the paper currency must be the paper currency existence state (S3).

These two conditions are both satisfied for the paper currency C05, so the logical state of the paper currency is changed to the paper currency temporal leave state (S6) (step 4 in FIG. 7).

During the paper currency temporal leave state (S6), the control unit 30 resets the second state counter CNT0 and restarts the CNT0 to count; the CNT0 begins to accumulate according to the clock period, while the value of the first state counter CNT1 is unchanged; the storage unit 20 keeps on collecting the state sequence of the optical sensor 10.

When the hole H02 leaves the optical sensor 10, the control unit 30 judges according to the condition (1) and the condition (2), and determines that the condition (2) is not satisfied because the last state is the paper currency temporal leave state (S6) but not the paper currency nonexistence state (S1), so the logical state of the paper currency is unchanged even though the hole H02 leaves the optical sensor 10 (step 5 in the FIG. 7).

Subsequently, the control unit 30 changes the state to the paper currency existence state (S3) (step 6 in FIG. 7).

When the paper currency leaves the optical sensor 10 actually, the control unit 30 determines the condition (5) and the condition (6) are both satisfied, and changes the state to the paper currency temporal leave state (S6) again (step 7 in FIG. 7).

The logical state of the paper currency is changed to the paper currency leave state (S2) when the control unit 30 detects that the following two conditions are satisfied (step 8 in FIG. 7):

(7) the time sequence state of the sensor is Q0, Q1==LL; and (8) the second state counter CNT0==P.

The paper currency leave state (S4) is also maintained for only one clock period, and the storage unit 20 calculates the paper currency information and stores the paper currency information into the location pointed by the record pointer. Until now, the detection and record of the paper currency is accomplished. FIG. 8 illustrates a schematic diagram of logical states of the paper currency C05 with the hole.

The present invention is not limited to the above embodiments and can be implemented with various variations. For example, in the embodiments of the present invention the paper currency detection is implemented with the optical sensor, however, in a same way, other types of sensors (such as a thickness detection sensor, an image detection sensor) are applicable, as long as the signal from the sensors can be binarized and can be represented as an appearance state or a disappearance state of the paper currency.

In addition, in the embodiments of the present invention description is mainly made with reference to how to eliminate the interference due to the worsened paper currency, and in a same way, the interference to the sensor's signal itself and the interference due to the paper material foreign matter (for example, scrap paper and fragmental paper) can also be eliminated by the present method.

What described above are preferable embodiments of the present invention. It should be noted that some improvements and modifications may be made by those ordinary skilled in the art without departing from the principle of the present invention, and these improvements and modifications are regarded as falling within the scope of the present invention.

The invention claimed is:

1. A paper currency detection apparatus, comprising:

a sensor unit for detecting a transmission state of a paper currency according to a fixed clock period, and binarizing the detected signal to represent whether the paper currency appears;

a storage unit for collecting the signal detected by the sensor unit, acquiring paper currency information in the signal and storing the paper currency information in sequence; and a control unit comprising a first state counter and a second state counter, wherein: the control unit resets the first state counter and starts the first state counter to count according to the fixed clock period when a time sequence state of the signal detected by the sensor unit represents that the paper currency appears and when a count value of the second state counter is 0 or reaches or exceeds a preset threshold; the control unit adjusts a pointer for recording the paper currency information in the storage unit to point to a next storage location of the paper currency information when a count value of the first state counter reaches or exceeds the preset threshold; the control unit resets the second state counter and starts the second state counter to count according to the fixed clock period when the time sequence state of the signal detected by the sensor unit represents that the paper currency disappears and the count value of the first state counter is 0 or reaches or exceeds the preset threshold; the control unit controls the storage unit to store the acquired paper currency information into the storage location pointed by the pointer when the count value of the second state counter reaches or exceeds the preset threshold.

2. The paper currency detection apparatus according to claim 1, further comprising a clock unit for providing the fixed clock period.

3. The paper currency detection apparatus according to claim 1, wherein the control unit suspends the counting of the second state counter and meanwhile resets the first state counter and starts the first state counter to count according to the fixed clock period when the time sequence state of the signal detected by the sensor unit represents that the paper currency appears and when the count value of the second state counter is 0 or reaches or exceeds the preset threshold;

the control unit suspends the counting of the first state counter and adjusts the pointer for recording the paper currency information in the storage unit to point to the next storage location of the paper currency information when the count value of the first state counter reaches or exceeds the preset threshold; the control unit suspends the counting of the first state counter and meanwhile resets the second state counter and starts the second state counter to count according to the fixed clock period when the time sequence state of the signal detected by the sensor unit represents that the paper currency disappears and when the count value of the first state counter is 0 or reaches or exceeds the preset threshold; the control unit suspends the counting of the second state counter and controls the storage unit to store the acquired paper currency information into the storage location pointed by the pointer when the count value of the second state counter reaches or exceeds the preset threshold.

4. The paper currency detection apparatus according to claim 1, wherein the preset threshold is determined by the following equation:

$$P=[K \cdot W/(V \cdot T)];$$

where P is the preset threshold, W represents a width between both sides of the paper currency paralleled with a transmission channel when the paper currency is being transmitted (in unit of mm); V represents a transmission rate of the transmission channel (in unit of mm/s); T represents the clock period outputted from a clock unit (in unit of ms); $[K \cdot W/(V \cdot T)]$ represents a rounding operation on $K \cdot W/(V \cdot T)$; and K represents a threshold coefficient.

5. The paper currency detection apparatus according to claim 4, wherein the width W is 70-78 mm, the transmission rate V of the transmission channel is 1000-1500 mm/s, the clock period T is 1-2 ms and K is 80-120, therefore the preset threshold P is 4-8.

6. A paper currency detection method used in a paper currency detection apparatus, wherein the paper currency detection apparatus comprises a sensor unit, a storage unit and a control unit, the method comprises:

A1, detecting a transmission state of a paper currency according to a fixed clock period and binarizing the detected signal to represent whether the paper currency appears, using the sensor unit of the paper currency detection apparatus;

A2, resetting a first state counter and starting the first state counter to count according to the fixed clock period, using the control unit of the paper currency detection apparatus, when a time sequence state of the signal detected by the sensor unit represents that the paper currency appears and when a count value of a second state counter is 0 or reaches or exceeds a preset threshold;

A3, adjusting, using the control unit of the paper currency detection apparatus, a pointer for recording paper currency information in the storage unit to point to a next storage location of the paper currency information when a count value of the first state counter reaches or exceeds the preset threshold;

A4, resetting the second state counter and starting the second state counter to count according to the fixed clock period, using the control unit, when the time sequence state of the signal detected by the sensor unit represents that the paper currency disappears and when the count value of the first state counter is 0 or reaches or exceeds the preset threshold; and A5, controlling, using the control unit, the storage unit to store the paper currency information acquired from the signal detected by the sensor unit into the storage location pointed by the pointer when the count value of the second state counter reaches or exceeds the preset threshold.

7. The paper currency detection method according to claim 6, wherein the fixed clock period is provided by a clock unit.

8. The paper currency detection method according to claim 6, wherein:

the step A2 comprises suspending the counting of the second state counter and meanwhile resetting the first state counter and starting the first state counter to count according to the fixed clock period by the control unit when the time sequence state of the signal detected by the sensor unit represents that the paper currency appears and when the count value of the second state counter is 0 or reaches or exceeds the preset threshold; and the step A3 comprises suspending the counting of the first state counter and adjusting the pointer for recording the paper currency information in the storage unit to point to the next storage location of the paper currency information by the control unit when the count value of the first state counter reaches or exceeds the preset threshold.

9. The paper currency detection method according to claim 6, wherein:

the step A4 comprises suspending the counting of the first state counter and meanwhile resetting the second state counter and starting the second state counter to count according to the fixed clock period by the control unit when the time sequence state of the signal detected by the sensor unit represents that the paper currency disappears and when the count value of the first state counter is 0 or reaches or exceeds the preset threshold; and the step A5 comprises suspending the counting of the second state counter and controlling the storage unit to store the acquired paper currency information into the storage location pointed by the pointer by the control unit when the count value of the second state counter reaches or exceeds the preset threshold.

10. The paper currency detection method according to claim 6, wherein the preset threshold is determined by the following equation:

$$P=[K \cdot W/(V \cdot T)];$$

where P is the preset threshold, W represents a width between both sides of the paper currency paralleled with a transmission channel when the paper currency is being transmitted (in unit of mm); V represents a transmission rate of the transmission channel (in unit of mm/s); T represents the clock period outputted from a clock unit (in unit of ms); $[K \cdot W/(V \cdot T)]$ represents a rounding operation of $K \cdot W/(V \cdot T)$; and K represents a threshold coefficient.

* * * * *